(12) United States Patent
Cho (10) Patent No.: US 7,393,608 B2
(45) Date of Patent: Jul. 1, 2008

(54) RECHARGEABLE BATTERY AND BATTERY MODULE USING THE SAME

(75) Inventor: Kyu-Woong Cho, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 248 days.

(21) Appl. No.: 11/131,232

(22) Filed: May 18, 2005

(65) Prior Publication Data

US 2005/0260491 A1 Nov. 24, 2005

(30) Foreign Application Priority Data

May 19, 2004 (KR) .................... 10-2004-0035482

(51) Int. Cl.
*H01M 10/38* (2006.01)
(52) U.S. Cl. ................. 429/123; 429/178; 429/152; 429/158
(58) Field of Classification Search ............... 429/123, 429/157, 149, 151, 152, 158, 161, 178
See application file for complete search history.

(56) References Cited

U.S. PATENT DOCUMENTS

| 4,436,795 | A * | 3/1984 | Cooper et al. ............. 429/53 |
| 6,287,719 | B1 * | 9/2001 | Bailey ..................... 429/94 |
| 2002/0071915 | A1 * | 6/2002 | Schubert et al. ........ 427/385.5 |
| 2003/0175588 | A1 * | 9/2003 | Zhang .................... 429/217 |
| 2003/0190522 | A1 * | 10/2003 | Ogata .................... 429/179 |

FOREIGN PATENT DOCUMENTS

| CN | 2422729 | | 3/2001 | |
| CN | 1366360 | * | 8/2002 | ............. 429/161 |
| JP | 6-86259 | | 12/1994 | |

* cited by examiner

*Primary Examiner*—Patrick Ryan
*Assistant Examiner*—Ben Lewis
(74) *Attorney, Agent, or Firm*—H.C. Park & Associates, PLC (57) ABSTRACT

The present invention relates to a rechargeable battery including an electrode assembly comprising a positive electrode, a negative electrode, and a separator interposed therebetween. The battery further comprises a case accommodating the electrode assembly and a plurality of positive electrode terminals and negative electrode terminals that are exposed outside of the case, connected to the case, and coupled to the electrode assembly.

18 Claims, 6 Drawing Sheets

RECHARGEABLE BATTERY AND BATTERY MODULE USING THE SAME

CROSS REFERENCE TO RELATED APPLICATION

This application claims priority to and the benefit of Korean Patent Application No. 10-2004-0035482 filed on May 19, 2004, in the Korean Intellectual Property Office, the entire disclosures of which are incorporated herein by reference.

BACKGROUND OF THE INVENTION

1. Field of the Invention

The present invention relates to a high power, high capacity, rechargeable battery that has an improved connecting structure between unit cells. The present invention also relates to a battery module using the rechargeable battery.

2. Discussion of the Background

There exists a need to develop a high power rechargeable battery that uses a non-aqueous electrolyte and has high energy density. Such a battery may be used in low capacity batteries in which battery cells are packaged into packs that serve as power sources for various portable small electronic devices such as cellular phones, laptop computers, and camcorders. Alternately, a high capacity rechargeable battery in which several tens of battery cells are connected in series or in parallel may be used as a power source for driving motors such as in a hybrid automobile.

Such a high capacity rechargeable battery or battery module is typically assembled by connecting a plurality of rechargeable batteries together in series to form a unit cell. Each unit cell is comprises an electrode assembly, a case, and a cap assembly.

That is, the unit cell may be fabricated into various shapes such as cylindrical and rectangular. An electrode assembly of the unit cell may comprise a bar of positive and negative electrode sheets and an insulator separator interposed therebetween that are wound together as in a jelly roll and are inserted into a case. The case is mounted with a cap assembly formed with outer terminals to provide a battery.

A rectangular unit cell having the above-mentioned structure is disclosed in Japanese Utility Application Laid-Open No. H06-86259. It also discloses a structure that has a cap with terminals protruding from the surface of the rectangular case.

However, since the rechargeable battery disclosed in the publication has terminals on only one side surface of the battery, it is difficult to connect unit cells together and the utilization of the battery is limited. That is, the positive electrodes and the negative electrodes of the electrode assembly are mounted with a conductive tab or a current collecting plate that collects current that is generated when operating the battery. The tab or the current collecting plate is connected with a positive electrode terminal and a negative electrode terminal that is mounted on the cap assembly via a lead to introduce the current that is generated in the positive electrode and the negative electrode to the positive electrode terminal and the negative electrode terminal, respectively.

However, since the above-mentioned positive electrode terminals and negative electrode terminals are mounted on only one side of the cap assembly, a separate connecting member is required to join the unit cells to provide a battery module. Therefore, it is difficult to connect the unit cells and the space utilization is deteriorated.

Figure 5:
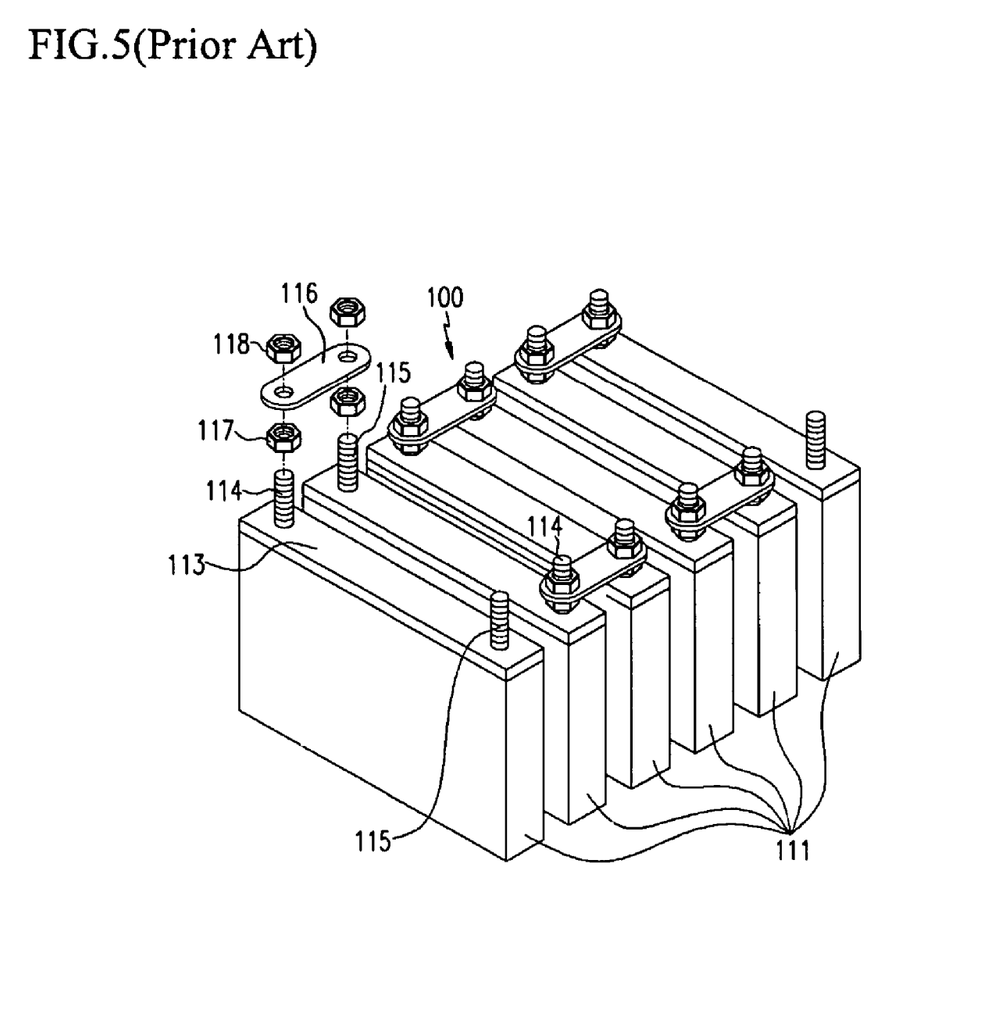
FIG. 5 is a schematic perspective view showing a rechargeable battery module according to the prior art.

FIG. 5 shows a battery module 100 according to the prior art in which units cells are connected in series. According to FIG. 5, the positive electrode terminal 114 and the negative electrode terminal 115 that protrude on the upper surface of the cap assembly 113 of each unit cell 111 are positioned beside the negative electrode terminal 115 and the positive electrode terminal 114 of the adjacent unit cell 111, respectively. The connection members 116 connect the threaded negative electrode terminals 115 and positive electrode terminals 114 via nuts 117, 118.

If the lower part of the case of the unit cell according to the prior art is positioned to face the floor, since both the positive electrode terminal and the negative electrode terminal are disposed on only the upper part of the case, the unit cells may have to be arranged beside each other to connect with each other in series or in parallel. Thus, the unit cells are positioned inefficiently with respect to a certain unit space.

This problem becomes more serious for hybrid electric vehicles that require numerous unit cells confined to a certain space to provide high capacity and high power. As the aforementioned unit cells of the prior art must be arranged in only one configuration the capacity and power are deteriorated per unit area are reduced.

In addition, in order to provide a battery module according to the prior art, several or several tens of unit cells are connected using nuts. The insulation of the nuts is difficult and time consuming, so the cost thereof is increased.

SUMMARY OF THE INVENTION

The present invention discloses a rechargeable battery that improves space utilization by improving the connection structures of terminals of unit cells to increase power and capacity of the battery per unit area. The present invention also discloses a battery module using the same.

The present invention also discloses a rechargeable battery in which the terminal structure of the battery is improved by simplifying the connection between unit cells to save time and labor required for connection and replacement work. The present invention also discloses a battery module using the same.

The rechargeable battery and battery module of the present invention are useful as the power source for high power electronic devices such as electric vehicles, hybrid electric vehicles, wireless vacuum cleaners, motorbikes, and motor scooters.

Additional features of the invention will be set forth in the description which follows, and in part will be apparent from the description, or may be learned by practice of the invention.

The present invention provides a rechargeable battery comprising an electrode assembly comprising a positive electrode, a negative electrode, and a separator interposed therebetween. The battery also comprises a case accommodating the electrode assembly and a plurality of positive electrode terminals and negative electrode terminals that are exposed from of the case, connected to the case, and coupled to the electrode assembly.

The present invention also provides a battery module comprising a rechargeable battery comprising a plurality of unit cells. The plurality of unit cells are coupled wherein one end of a unit cell and another end thereof are respectively provided with a positive electrode terminal and a negative electrode terminal so that at least two unit cells can be coupled.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

The present invention provides a rechargeable battery comprising an electrode assembly comprising a positive electrode, a negative electrode, and a separator interposed therebetween. The rechargeable battery also comprises a case that accommodates the electrode assembly and a plurality of positive electrode terminals and negative electrode terminals that are exposed outside the case, connected to the case, and coupled to the electrode assembly. The rechargeable battery is preferably formed as a rectangular case and an electrode assembly that is wound like a jelly roll.

The positive electrode and the negative electrode of the electrode assembly each comprise a current collector, a coated region coated with active materials, and an uncoated region. The uncoated region is formed along one end of each of the positive electrode and the negative electrode in opposite directions to form both ends of the electrode assembly.

The uncoated region of the negative electrode and the uncoated region of the positive electrode are disposed on each side of the case when the case is positioned for the top cap assembly to face upwards. This allows the positive electrode terminal and the negative electrode terminal mounted on the top cap assembly and the positive electrode terminal and the negative electrode terminal mounted on the bottom cap assembly to be coupled to the uncoated regions of the positive electrode and the negative electrode via the tab (or current collecting plate), respectively.

In the above-mentioned structure, the other side of the case may be provided with a positive electrode terminal and a negative electrode terminal with a separate insulating member positioned in between the case and the negative electrode terminal and the positive electrode terminal to insulate them. Each end of the case for the rechargeable battery may be provided with a cap assembly that is mounted with a positive electrode terminal and a negative electrode terminal in order to close the case and to couple to the electrode assembly.

The positive and negative electrode terminal pairs that are mounted at each end of the case may be disposed such that the positive electrodes and the negative electrodes are respectively mounted on the same side or on opposite sides. Further, the terminals mounted on the ends of the case preferably have a post structure that has a threaded surface.

According to the battery module of the present invention in which several unit cells are coupled, both ends of a unit cell are respectively mounted with the positive electrode terminal and the negative electrode terminal so that at least two unit cells can be coupled thereto via connection members.

The unit cells for the battery module may be connected in series or in parallel via connection members while disposing them in both vertical and horizontal directions. The unit cells for the battery module are arranged in the vertical direction by connecting upper terminals mounted on the ends of a unit cell to lower terminals of a unit cell directly thereabove, via a connection conductor, in series or in parallel. Further, the unit cells are disposed in the horizontal and vertical directions to connect adjacent unit cells via a connection conductor and a connection member in series or in parallel.

The terminals mounted on the unit cells have a threaded axis structure formed with a screw mount. The connection conductor is composed of a nut having a length sufficient to fasten two terminals together, so that two unit cells can be coupled with one nut when the terminals of the two unit cells are aligned in a lengthwise direction.

Hereinafter, preferable embodiments of the present invention are described in detail with reference to the attached drawings.

Figure 1:
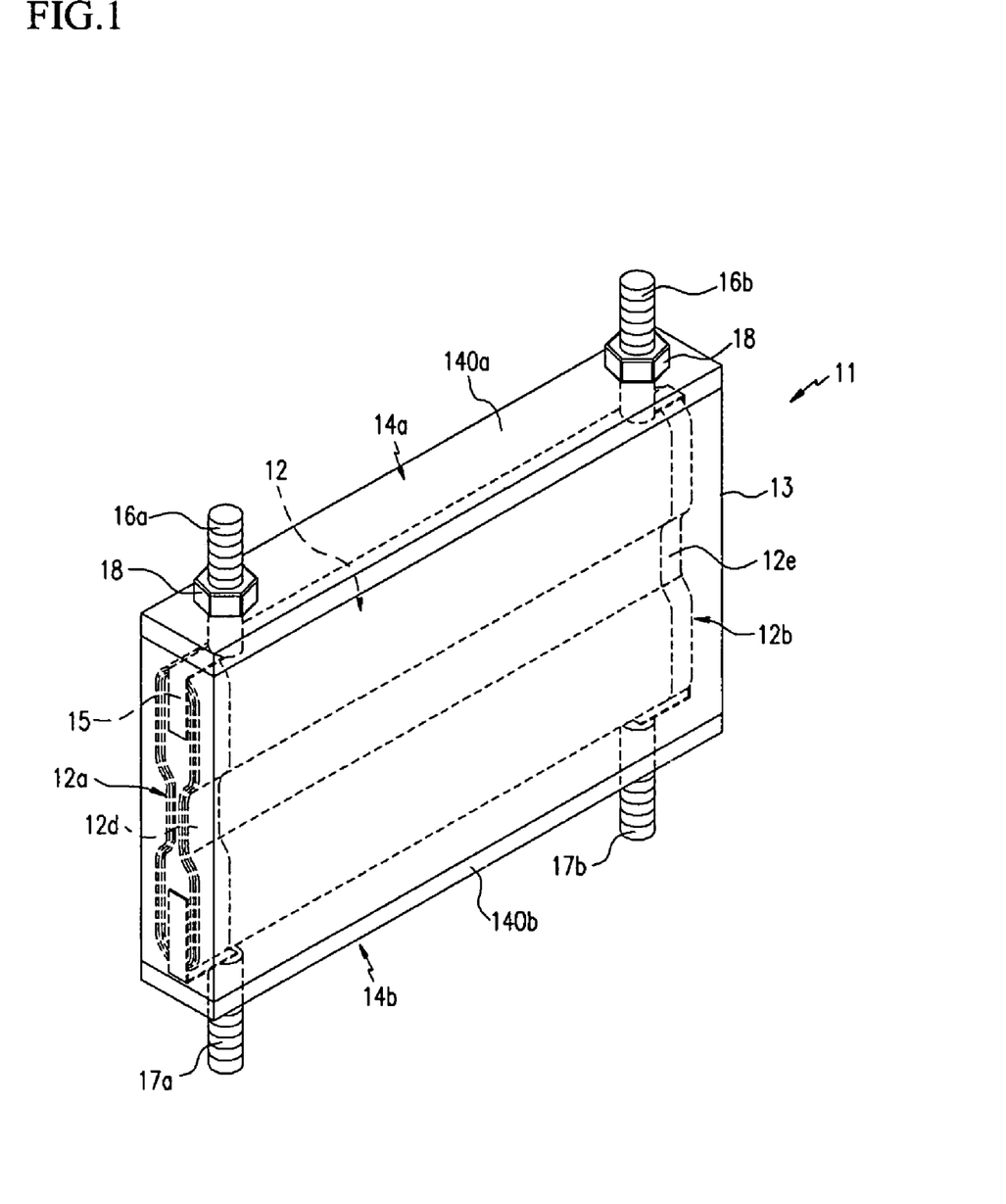
FIG. 1 is a schematic perspective view showing a rechargeable battery according to an embodiment of the present invention.
Figure 2A:
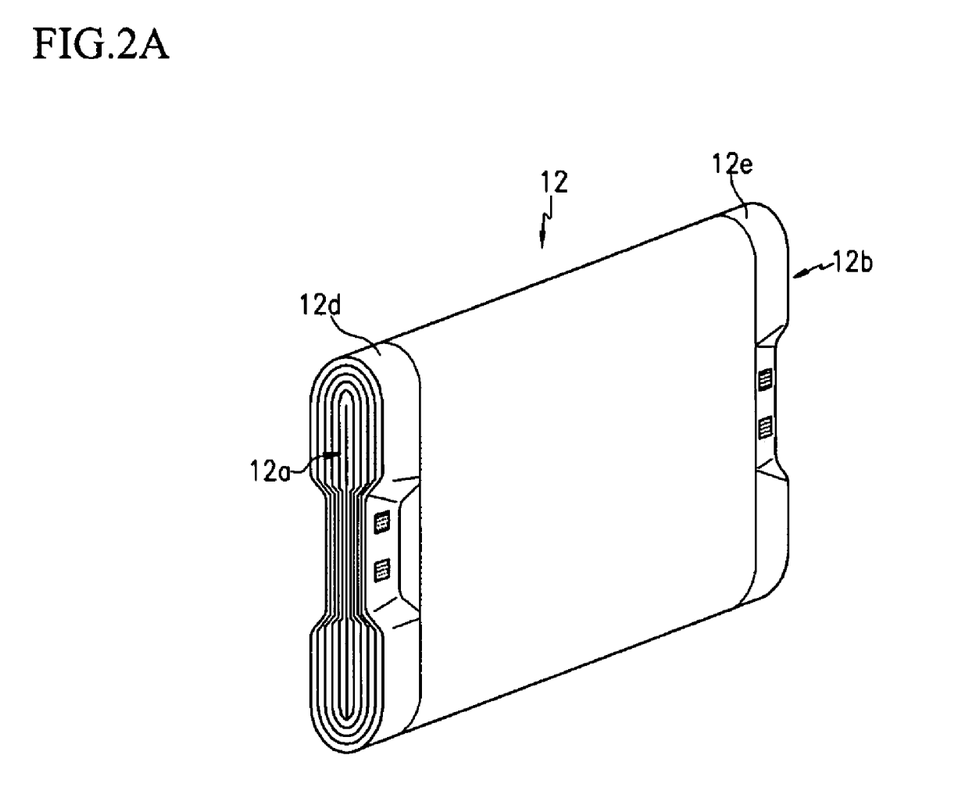
FIG. 2A is a perspective view showing ajelly roll type of electrode assembly.
Figure 2B:
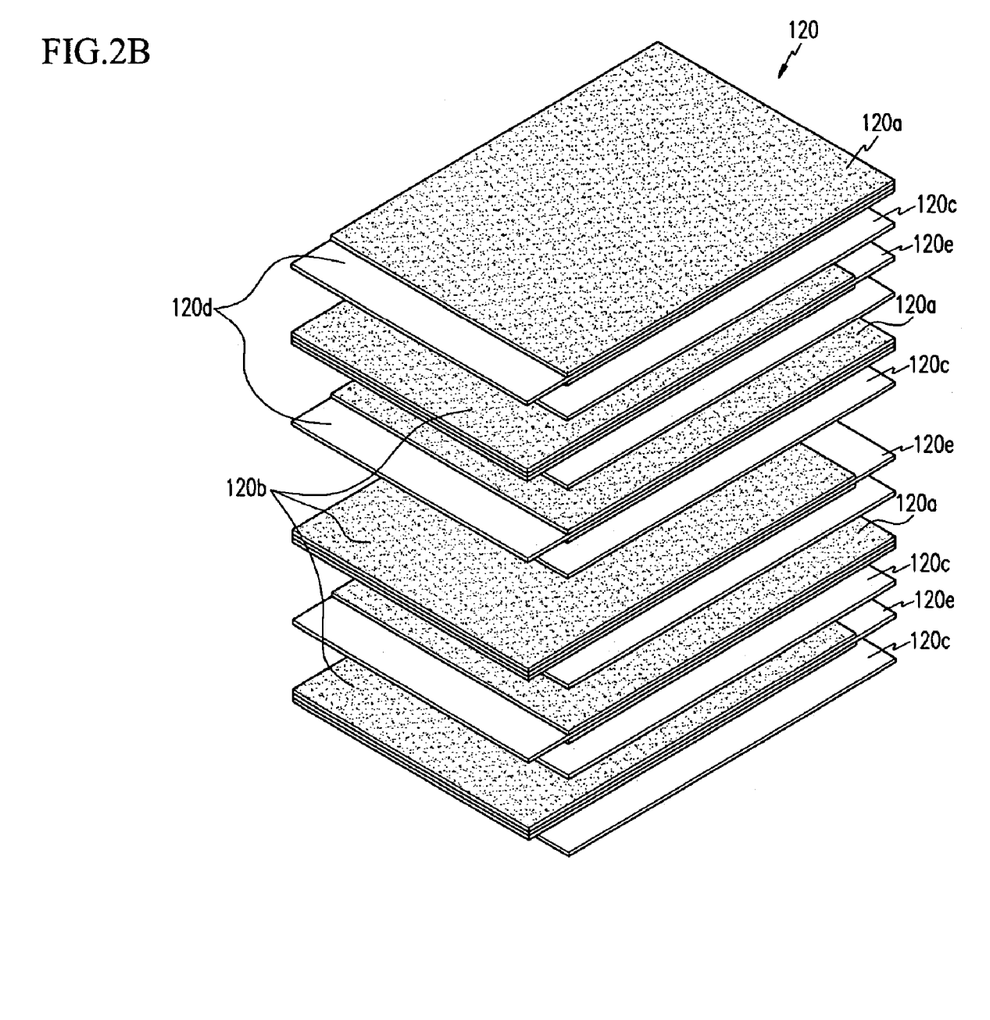
FIG. 2B is an exploded perspective view showing a lamination type of electrode assembly.
Figure 3:
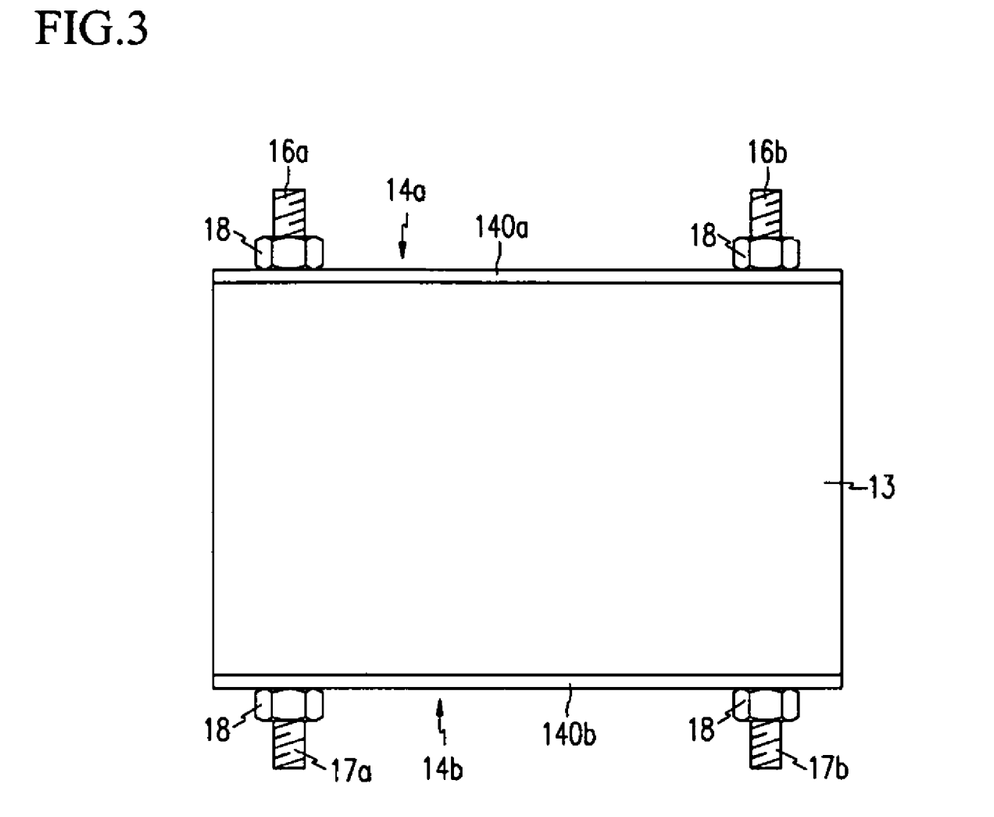
FIG. 3 is a front view showing a rechargeable battery according to an exemplary embodiment of the present invention.
Figure 4:
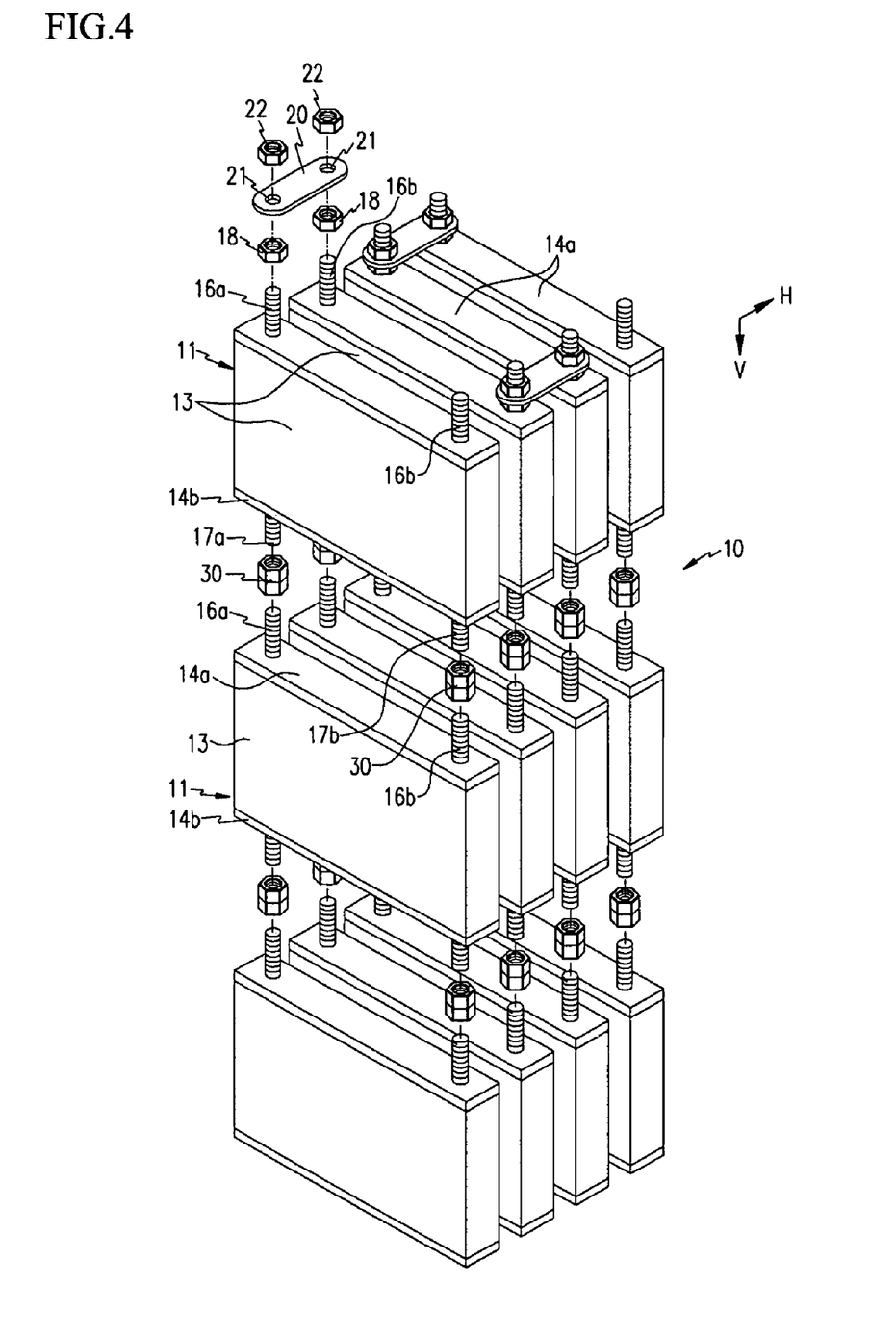
FIG. 4 is a schematic perspective view showing a battery module in which unit cells are connected according to another exemplary embodiment of the present invention.

FIG. 1 is a schematic perspective view showing a rechargeable battery according to an exemplary embodiment of the present invention. FIG. 2A is a perspective view showing a jelly roll type of electrode assembly. FIG. 2B is an exploded perspective view showing a lamination type of electrode assembly. FIG. 3 is a front view of the rechargeable battery according to another exemplary embodiment of the present invention. FIG. 4 is a schematic perspective view showing the battery module in which unit cells are connected according to the present invention.

Referring to FIG. 1, each unit cell 11 for the high capacity battery module comprises an electrode assembly 12 comprising a negative electrode, a positive electrode, and a separator interposed therebetween. The unit cell also comprises a case 13 enclosing a space accommodating the electrode assembly 12, cap assemblies 14a, 14b connected at the upper end and the lower end of the case respectively, via a gasket when the case 13 is enclosed by the same. In addition, positive electrode terminals 16a, 17a and negative electrode terminals 16b, 17b protrude out of each cap assembly 14a, 14b of each unit cell 11. Each terminal 16a, 16b, 17a, 17b is threaded and is coupled to the positive electrode 12a and the negative electrode 12b via a tab 15.

The case 13 is fabricated with a conductive metal such as aluminum, an aluminum alloy, or steel plated with nickel, for example, and is formed into a hexahedron or other shapes that have an inner space that accommodates an electrode assembly.

Further, the cap assemblies 14a, 14b are firmly mounted to the terminals on the surface thereof, and may comprise a gasket (not shown) insulating between the case 13 and the cap plates 140a, 140b. The cap assemblies may further comprise a vent plate (not shown) that vents gas by being ruptured at a set pressure to prevent expansion of the battery.

Referring to FIG. 2A, the electrode assembly 12 may be formed as a wound jelly roll type in which a positive electrode 12a and a negative electrode 12b coated with an appropriate active material on the respective current collectors are laminated with a separator interposed therebetween and are then spiral-wound in a jelly roll shape. Both ends of the jelly roll type of electrode assembly are provided with uncoated regions 12d, 12e. FIG. 2B shows a lamination type of electrode assembly 120 in which positive electrodes 120a and negative electrodes 120b that are coated with each active material on the respective current collectors are laminated with a separator 120c interposed therebetween, and an end each of the positive electrodes 120a and negative electrodes 120b are provided with uncoated regions 120d, 120e.

Hereinafter, examples are described with reference to the jelly roll type of electrode assembly 12 as shown in FIG. 2A. Needless to say, the laminated electrode assembly 120 as shown in FIG. 2B may alternately be employed.

Further, these examples are described with reference to the structure in which the uncoated region 12d of the positive electrode and the uncoated region 12e of the negative electrode that are coupled to the respective terminals are each formed along one end of each electrode for the electrode assembly 12. Needless to say, the present invention is not limited to the above-mentioned structure and is applicable to all battery shapes as well as those without the uncoated regions.

According to this embodiment of the present invention, the electrode assembly 12 for the rechargeable battery comprises an uncoated region 12d of the positive electrode and an uncoated region 12e of the negative electrode that face each other at respective ends of the jelly roll type of electrode assembly. The positive electrode 12a, the negative electrode 12b, and the separator that is interposed therebetween are wound into a jelly roll shape. When the case 13 is vertically positioned to install the cap assemblies 14a, 14b at upper and lower ends thereof, the uncoated regions 12d, 12e of the positive electrode 12a and the negative electrode 12b are disposed at opposite ends of the case. The terminals 16a, 17a, 16b, 17b of the cap assemblies 14a, 14b are coupled via tabs 15 (or current collecting plates) that are mounted to the uncoated region 12d, 12e.

The rechargeable battery has a structure in which the electrode terminals 16a, 16b and the electrode terminals 17a, 17b are respectively protruded upwardly and downwardly at the ends of the case 13.

As shown in FIG. 4, a plurality of the above-mentioned unit cells 11 are arranged with and are connected to each other in series or in parallel to provide a battery module 10. According to this embodiment, when a unit cell 11 is positioned vertically so that the terminals 16a, 16b, and 17a, 17b respectively face upward and downward, the unit cells 11 are positioned in both a horizontally stacked direction (H direction in FIG. 4) and in a vertical direction (V direction in FIG. 4) to connect them together.

When the unit cells 11 are positioned in the horizontal direction H to connect with each other, a unit cell is disposed to face an adjacent unit cell with a space therebetween. The positive electrode terminals 16a and negative electrode terminals 16b that protrude from the upper cap assemblies 14a of the unit cells are arranged such that the positive electrode terminal 16a of one unit cell and the negative electrode terminal 16b of the adjacent unit cell are beside each other. This pattern is repeated while maintaining a certain distance between the unit cells 11 based on the centers thereof, to form a terminal row, which is one line that has terminals in which polarities are alternatively arranged.

In order to connect the unit cells 11 in series, the positive electrode terminal 16a of one unit cell 11 and the negative electrode terminal 16b of the adjacent unit cell are coupled via a connection member 20. The connection member 20 has a plate structure that is formed with holes 21 at both ends. A nut 18 is threaded onto each terminal 16a, 16b, and the terminals 16a, 16b are inserted through the holes 21 and the connection member 20 is fastened with nuts 22 to affix it thereto. This confirmation allows the positive electrode terminals 16a of unit cells 11 to be connected to the negative electrode terminals 16b of adjacent unit cells 11 via connection member 20 to form the terminal row of serially connected unit cells 11 along the H direction.

In addition, as shown in FIG. 4, the unit cells may be arranged to connect with each other in a vertical direction V.

A positive electrode terminal 17a and a negative electrode terminal 17b that are mounted on the lower cap assembly 14b of one unit cell 11 respectively face the positive electrode terminal 16a and the negative electrode terminal 16b that are mounted on the upper cap assembly 14a of the adjacent unit cell 11 in the V direction. The positive electrode terminals 17a, 16a of the adjacent unit cells 11 are fastened together by connection conductors 30 in the form of nuts to couple them to each other in the vertical direction in a parallel circuit.

In other words, the positive electrode terminal (or the negative electrode terminal) mounted on the lower cap assembly 14b of the upper unit cell is fastened to the positive electrode terminal (or the negative electrode terminal) mounted on the upper cap assembly 14a of the lower unit cell through both ends of the connection conductor 30. This configuration allows the terminals of two unit cells that are coupled via one connection conductor 30 to be coupled to each other in parallel. Therefore, the unit cells may be arranged in a vertical direction V as well as in a horizontal direction H to electrically connect to each other. It is then possible to couple many unit cells 11 and to maximize the capacity of the battery module 10.

The unit cells of the H or V configurations may be coupled in series or in parallel. When the unit cells are disposed in the vertical direction, the terminal positions of the unit cells 11 can alternate to form a terminal row in which positive electrode terminals and negative electrode terminals are repeatedly connected to each other in a vertical direction. Thereby, the positive electrode terminal 17a of one unit cell 11 is fastened to the negative electrode terminal 16b of a vertically adjacent unit cell with a certain interval via a connection member 30 to connect the unit cells 11 in series.

All unit cells disposed in a horizontal or a vertical direction are generally connected in series so that the power of the battery module is maximized.

According to this embodiment of the present invention, several unit cells may be easily connected in series or in parallel to form a battery module. Further, when a plurality of unit cells are coupled together, the arranged structure of the unit cells may be varied to carry more unit cells per certain unit space so that the power and capacity thereof are maximized per unit area.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
   an electrode assembly comprising a positive electrode, a negative electrode, and a separator interposed therebetween;
   a case accommodating the electrode assembly; and
   a plurality of positive electrode terminals and negative electrode terminals exposed outside of the case, connected to the case, and coupled to the electrode assembly,
      wherein pairs of a positive electrode terminal and a negative electrode terminal are respectively disposed on cap assemblies and are mounted on opposite sides of the case,
      wherein the positive electrode terminals are aligned with each other from opposite sides of the case, and
   wherein the negative electrode terminals are aligned with each other from opposite sides of the case.

2. The rechargeable battery of claim 1,
   wherein the positive and negative electrode terminals that are provided at one end of the case have the same polarity as the positive electrode terminal and negative electrode terminal provided at the other end of the case.

3. The rechargeable battery of claim 2,
wherein opposite end surfaces of the electrode assembly are respectively provided with an uncoated region of the positive electrode and an uncoated region of the negative electrode, and
wherein the positive electrode terminals and the negative electrode terminals that are mounted on ends of the case are coupled to the uncoated region of the positive electrode and the uncoated region of the negative electrode, respectively via a tab or a current collecting plate.

4. A motor that is powered by the rechargeable battery of claim 1.

5. The rechargeable battery of claim 1,
wherein the electrode assembly has a spiral-wound jelly roll shape.

6. The rechargeable battery of claim 1,
wherein the case has a rectangular box shape.

7. A battery module, comprising:
a rechargeable battery comprising a plurality of unit cells,
wherein the plurality of unit cells are coupled together, and
wherein one end of a unit cell is provided with a positive electrode terminal and a negative electrode terminal, and an opposite end thereof is provided with another positive electrode terminal and another negative electrode terminal so that at least two unit cells can be coupled together,
wherein the positive electrode terminals are aligned with each other from opposite ends of the unit cell,
wherein the negative electrode terminals are aligned with each other from opposite ends of the unit cell.

8. The battery module of claim 7,
wherein the unit cells are disposed in a horizontal direction and are coupled via connection members that are coupled to the electrode terminals.

9. The battery module of claim 8,
wherein the connecting members are formed with holes on both ends thereof to insert terminals of unit cells therein, and
wherein the terminals are externally threaded to be fastened with nuts.

10. The battery module of claim 9,
wherein the connection member couples the positive electrode terminal of one unit cell with the negative electrode terminal of an adjacent unit cell in series.

11. The battery module of claim 9,
wherein the connection member couples electrode terminals of adjacent unit cells with the same polarity in parallel.

12. The battery module of claim 7,
wherein the unit cells are arranged in the horizontal direction to couple electrode terminals of adjacent unit cells with the same polarity or different polarities via a connection conductor in series or in parallel.

13. The battery module of claim 12,
wherein the connection conductor is formed as a nut that fastens two externally threaded terminals.

14. The battery module of claim 13,
wherein the connection conductor couples a positive electrode terminal of one unit cell with a negative electrode terminal of an adjacent unit cell in series.

15. The battery module of claim 13,
wherein the connection conductor couples electrode terminals with the same polarity of adjacent unit cells and couples the unit cells in parallel.

16. The battery module of claim 8,
wherein the unit cells are disposed both vertically and horizontally with respect to each other, and
wherein the unit cells are coupled to adjacent unit cells via a connection conductor or a connection member in series or in parallel.

17. The battery module of claim 12,
wherein the unit cells are disposed both vertically and horizontally with respect to each other, and
wherein the unit cells are connected to adjacent unit cells via a connection conductor or a connection member in series or in parallel.

18. A motor that is powered by the battery module of claim 16.

* * * * *